United States Patent
Guo et al.

(10) Patent No.: US 9,280,189 B2
(45) Date of Patent: Mar. 8, 2016

(54) COMPUTER SYSTEM WITH A UID LIGHT CONTROL, POWER INDICATION, AND RESET

(71) Applicants: INVENTEC (PUDONG) TECHNOLOGY CORPORATION, Shanghai (CN); INVENTEC CORPORATION, Taipei (TW)

(72) Inventors: Yuan-Hui Guo, Shanghai (CN); Wen-Tao Wang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 212 days.

(21) Appl. No.: 14/206,735

(22) Filed: Mar. 12, 2014

(65) Prior Publication Data

US 2015/0149748 A1 May 28, 2015

(30) Foreign Application Priority Data

Nov. 27, 2013 (CN) .......................... 2013 1 0617116

(51) Int. Cl.
*G06F 1/24* (2006.01)
*G06F 1/28* (2006.01)
*G06F 3/023* (2006.01)
*G06F 11/32* (2006.01)

(52) U.S. Cl.
CPC .. *G06F 1/24* (2013.01); *G06F 1/28* (2013.01); *G06F 3/023* (2013.01); *G06F 11/32* (2013.01)

(58) Field of Classification Search
CPC ............ G06F 11/32; G06F 1/24; G06F 1/28; G06F 3/023
See application file for complete search history.

(56) References Cited

U.S. PATENT DOCUMENTS

| | | | | | |
|---|---|---|---|---|---|
| 5,691,619 | A | * | 11/1997 | Vingsbo | G05B 9/02 307/10.7 |
| 5,987,613 | A | * | 11/1999 | Busch | G06F 1/1616 713/300 |
| 6,545,852 | B1 | * | 4/2003 | Arnold | B60T 17/22 361/152 |
| 7,181,340 | B2 | * | 2/2007 | Endo | F02D 41/26 701/114 |
| 2011/0024500 | A1 | * | 2/2011 | McReynolds | G06K 17/0022 235/385 |
| 2013/0111198 | A1 | * | 5/2013 | Tsutsui | G06F 9/00 713/1 |
| 2014/0143528 | A1 | * | 5/2014 | Tsutsui | G06F 1/24 713/1 |

* cited by examiner

*Primary Examiner* — Thomas Lee
*Assistant Examiner* — Chad Erdman
(74) *Attorney, Agent, or Firm* — Bacon & Thomas, PLLC

(57) ABSTRACT

A computer system is disclosed. When a user conducts different operations on a switch module, a switch module generates different clicking indication signal, and a logic control module generates a corresponding signal according to clicking indication signals so that a management control module processes a signal generated by a logic control module. As such, a single switch may be used to trigger multiple functions, whereby achieving in the efficacy of saving a design cost of a server panel.

16 Claims, 3 Drawing Sheets

COMPUTER SYSTEM WITH A UID LIGHT CONTROL, POWER INDICATION, AND RESET

BACKGROUND OF THE RELATED ART

1. Technical Field

The present invention relates to a computer system, and particularly to a computer system generating a control signal for controlling the computer system according to a clicking indication signal.

2. Related Art

On a panel of a server, it usually comprises a certain amount of indicator lights and switches. The indicator lights may indicate an operational state to a user, and the switches may provide the user to operate the server.

To enable the user to accurately click the switches on the server panel, each of the switches may occupy a certain amount of area on the server panel. However, to accommodate the server in a rack, the server panel is not too large in volume.

With increase of functions provided by the server, the number of the indicator lights and switches increase correspondingly. For example, the function of a UID light is also provided in addition to the functions of booting and reactivation on the server panel. Therefore, a switch for the UID light is also required on top of the two switches and multiple indicator light. And, the UID light is also additionally provided. When the switch of UID light is pressed, a control signal for controlling the UID light is generated, so that the server turns on or off the UID light.

It may be know for the above that there is a more and more high difficulty for arranging various indicator light and switches on a limited area of the server panel.

In view of the above, there is long an issue of arranging the switches for some new functions on a limited area of the server panel, and which requires to be improved by some technical means.

SUMMARY

In view of the above issue existing in the prior art, where arranging switches for some new functions on a limited area of a server panel becomes more and more difficult. The present invention discloses a computer system and a clicking signal processing method for the computer system.

According to a first embodiment of the present invention, the computer system comprises a switch module, generating a first clicking indication signal and a second clicking indication signal; a power control module, generating a standby power good signal; a logic control module, connected to the switch module and the power control module, outputting a UID light control signal according to the first clicking indication signal and the power good signal when receiving the first clicking indication signal and the power good signal, and outputting a reset signal according to the second clicking indication signal and the power good signal when receiving the second clicking indication signal and the power good signal; and a management control module, connected to the logic control module, controlling a UID light of the computer system according to the UID light control signal when receiving the UID light control signal, and resetting the management control module when receiving the reset signal.

According to a second embodiment of the present invention, the computer system comprises a switch module, generating a third clicking indication signal and a fourth clicking indication signal; a power control module, generating a standby power good signal; a logic control module, connected to the switch module and the power control module, outputting a UID light control signal according to the third clicking indication signal and the power good signal when receiving the third clicking indication signal and the power good signal, and outputting a power-on signal according to the fourth clicking indication signal and the power good signal when receiving the fourth clicking indication signal and the power good signal; and a management control module, connected to the logic control module, controlling the computer system to power on according to the power-on signal when receiving the power-on signal, and controlling a UID light of the computer system according to the UID light control signal when receiving the UID light control signal.

According to a first embodiment of the present invention, the clicking signal processing method for a computer system comprising a switch module, a power control module, a logic control module and a management control module, comprising steps of providing a first operation and a second operation for a user on the switch module; generating a first clicking indication signal or a second clicking indication signal by the switch module according to the first operation or the second operation respectively; outputting a UID light control signal according to the first clicking indication signal and the power good signal by the logic control module when receiving the first clicking indication signal and the power good signal; outputting a reset signal according to the second clicking indication signal and the power good signal when receiving the second clicking indication signal and the power good signal; and controlling a UID light of the computer system according to the UID light control signal by the management control module when receiving the UID light control signal, and resetting the management control module when receiving the reset signal.

According to a second embodiment of the invention, the clicking signal processing method for a computer system comprising a switch module, a power control module, a logic control module and a management control module, comprising steps of providing a third operation or a fourth operation for a user on the switch module; generating a third clicking indication signal or a fourth clicking indication signal according to the third operation or the fourth operation respectively, by the switch module; outputting a UID light control signal according to the third clicking indication signal and the power good signal by the logic control module when receiving the third clicking indication signal and the power good signal; and outputting a power-on signal according to the fourth clicking indication signal and the power good signal by the logic control module when receiving the fourth clicking indication signal and the power good signal; and controlling the computer system to power on according to the power-on signal when receiving the power-on signal, and controlling a UID light of the computer system according to the UID light control signal when receiving the UID light control signal.

From the above description, it may be known that the computer system and clicking signal processing method therefor have the difference as compared to the prior art that when the user conducts different operations on the switch module, the switch module generates different clicking indication signal, and the logic control module generates a corresponding signal according to the clicking indication signals so that the management control module processes the signal generated by the logic control module, whereby solving the issue existing in the prior art and achieving the efficacy of saving a design cost of the server panel.

BRIEF DESCRIPTION OF THE DRAWINGS

The invention will become more fully understood from the detailed description given herein below illustration only, and thus is not limitative of the present invention, and wherein.

DETAILED DESCRIPTION

The present invention will be apparent from the following detailed description, which proceeds with reference to the accompanying drawings, wherein the same references relate to the same elements.

In the following, the context is given to describe the present invention in details in connection with the annex drawings and the embodiments with respect to the features and implementations thereof, which is sufficient to enable those who skilled in the art readily to realize the technical mechanism intent to solve the technical problems and implement the same, so as to achieve in the efficacy exclaimed in the present invention.

The present invention may generate a corresponding signal according to a particular clicking indication signal generated by the switch on a computer system, whereby the switch maybe used to control particular hardware elements on the computer system with the presence of the current state of the computer system, in which the switch may be a power switch and a UID light, but not limited thereto.

In the present invention, the mentioned "presence of the current state of the computer system" refers to that when the computer system is under the state of "standby", keep the computer system under a to-be-booted state, while when the computer system is under the power-on state, keep the computer under a power-on state. At this time, in the computer system 100 only some particular management circuits may be on work state, and a circuit for booting has been already. That is, upon clicking a booting key by a user, the computer system 100 may be booted.

Figure 1:
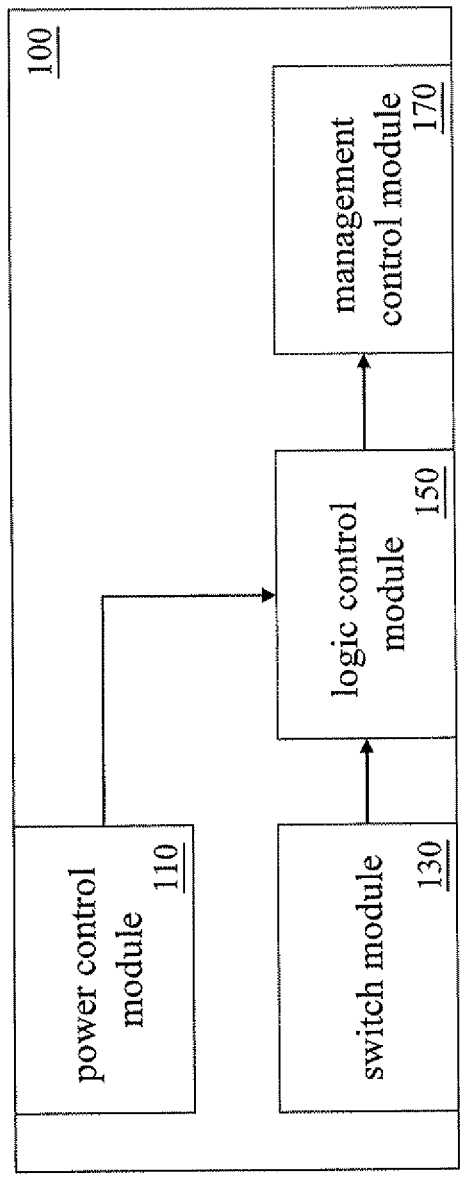
FIG. 1 is a system architecture of a computer system according to the present invention.

In the following, FIG. 1 is a system architecture diagram and used to illustrate the operation of the computer system according to the present invention. As shown in FIG. 1, the computer system 100 of the present invention comprises a power control module 110, a switch module 130, a logic control module 150 and a management control module 170.

The power control module 110 generates a power good signal.

The switch module 130 is used to generate a clicking indication signal. Typically, the switch module 130 comprises one or multiple switch, or a switch combination element including switches and an indication lights. When a user operates on a switch, the switch module 130 generates the clicking indication signal corresponding to the operation.

With the different operations on the switch in the switch module 130 by the user, the generated clicking indication signal by the switch module 130 is also different. For example, when the UID light in the switch module 130 is shortly clicked (lightly clicked) by the user, the clicking indication signal (the first clicking indication signal) generated by the switch module 130 is kept at an effective voltage level within a predetermined time period (first predetermined time period). For example, the first clicking indication signal is a signal maintaining at 3.3V and for 0.5 seconds. In a preferred embodiment, the UID light is a UID LED.

On the other side, when the UID switch in the switch module 130 is long clicked by the user, the switch module 130 the clicking indication signal (the second clicking indication signal) generated by the switch module 130 is kept at an effective voltage level within a second predetermined time period other than the first predetermined time period. For example, the second clicking indication signal is a signal maintaining at 3.3V and for 4 seconds.

Further, when the power switch in the switch module 130 is double clicked continuously, the clicking indication signal (the third clicking indication signal) of the switch module 130 may experience four times of voltage changes, and the voltage level between two same voltage level changes may maintain a time period. For example, the third clicking indication signal is changed in its voltage level subsequently from 3.3V to 0V, 0V to 3.3V, 3.3V to 0V, and finally 0V to 3.3V.

In the above, after the twice of change from 3.3V to 0V, the voltage levels are both maintained at 0V and for 0.5 seconds and changed to 3.3V. When the power switch in the switch module 130 is shortly clicked (slightly clicked), the clicking indication signal (the fourth clicking indication signal) may experience twice of voltage level change. Further, the voltage level after the first time of voltage level change may maintain another time period, and then a second time of voltage change may occur. For example, after the fourth clicking indication signal is changed from 3.3V to 0V, the voltage is changed from 0V to 3.3V.

The logic control module 150 is connected to the power control module 110 and the switch module 130. In some embodiments, the logic control module 150 is a complex programmable logic device (CPLD), without limiting the present invention.

After receiving the clicking indication signal and power good signal, the logic control module 150 select to output a corresponding signal according to the received clicking indication signal and the power good signal. For example, the logic control module 150 may output a reset signal when receiving the first clicking indication signal generated by the UID light switch, the power good signal is maintained continuously at the effective level within the first predetermined time period when the first clicking indication signal is maintained at the effective level, outputting the UID light control signal, receiving the second clicking indication signal from the UID light switch and the power good signal is also kept continuously at the effective level within a second predetermined time period when the second clicking indication signal is maintained at the effective level.

As another example, the logic control module 150 outputs the UID control signal upon receiving the third clicking indication signal experiencing four times of changes generated by the power switch, while a booting signal upon receiving the fourth clicking indication signal experiencing two time of voltage changes generated by the power switch.

Generally, the logic control module 150 may pre-define a corresponding signal to be outputted when receiving some type of clicking indication signal generated by some type of switch. However, this is merely an example, without limiting the present invention.

In addition, to completely receiving the clicking indication signal generated by the switch module 130, the logic control module 150 will use a debounce procedure to receive the clicking indication signal, without limiting the present invention.

The management control module 170 is connected to the logic control module. In some embodiments, the management control module 170 is a baseboard management controller (BMC), without limiting the present invention.

The management control module 170 processes the signal outputted from the logic control module 150. For example, when the management control module 170 receives the UID control signal, it controls the UID light of the computer system according to the UID light control signal, so that the UID light is turned on and thus positions the device. As such, the user may rapidly get the position of the device lighting by the UID light. On the other hand, when the management control module 170 receives the reset signal, it is reset. Alternatively, when receiving the booting signal, the management control module 170 controls the device to boot according to the booting signal.

It is to be noted that the management control module 170 may receive the signal outputted from the logic control module 150 no matter which state the device is under between the to-be-booted state and the booting state (without being shut down or reactivated). That is, the management control module 170 may reset the management control module 170 when the computer system 100 is at the to-be-booted state or booting state, and may also turns on the UID light when the computer system 100 is at the to-be-booted state or the booting state.

Figure 2A:
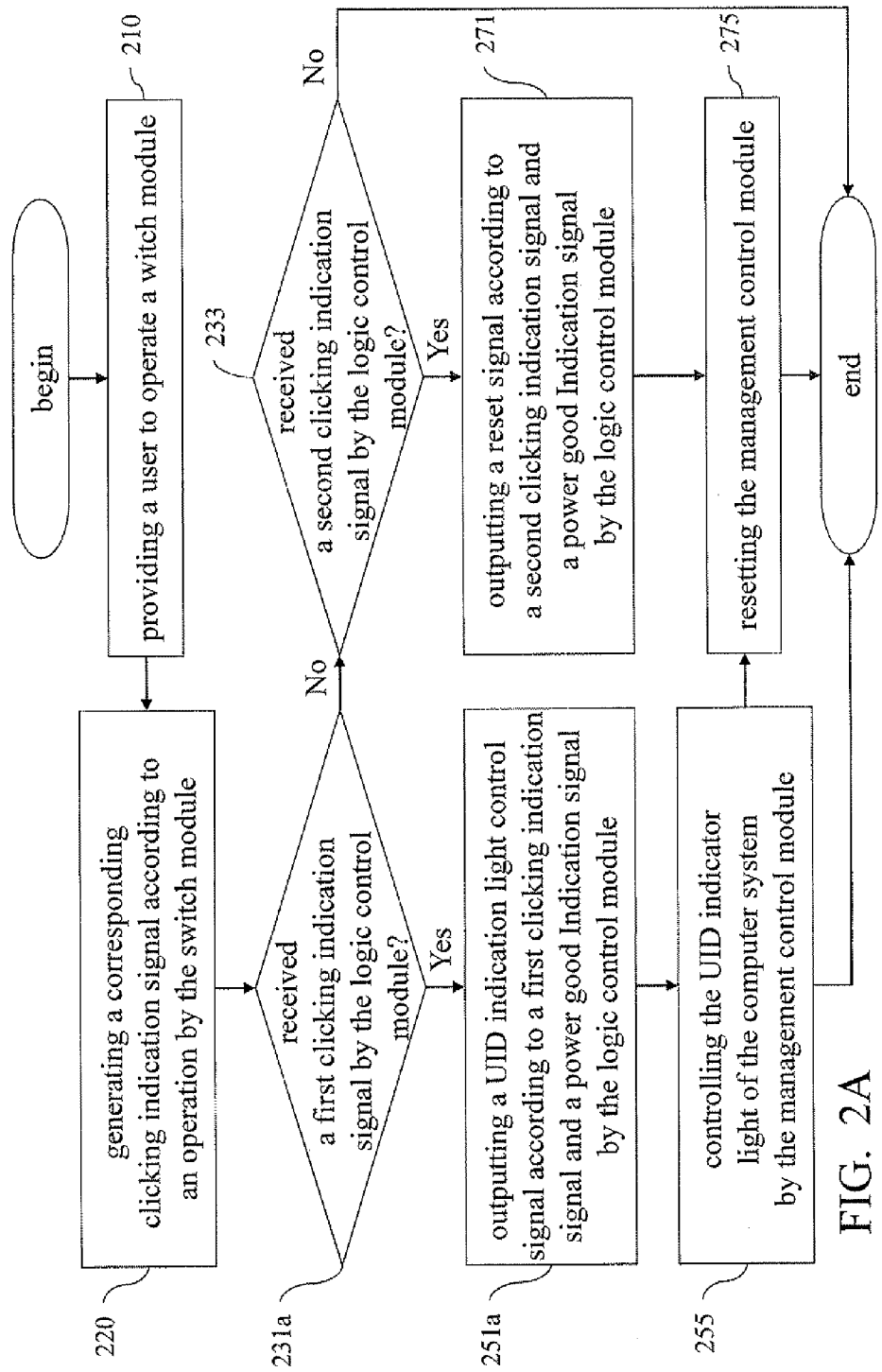
FIG. 2A is a flowchart of a clicking signal processing method for the computer system according to the present invention.
Figure 2B:
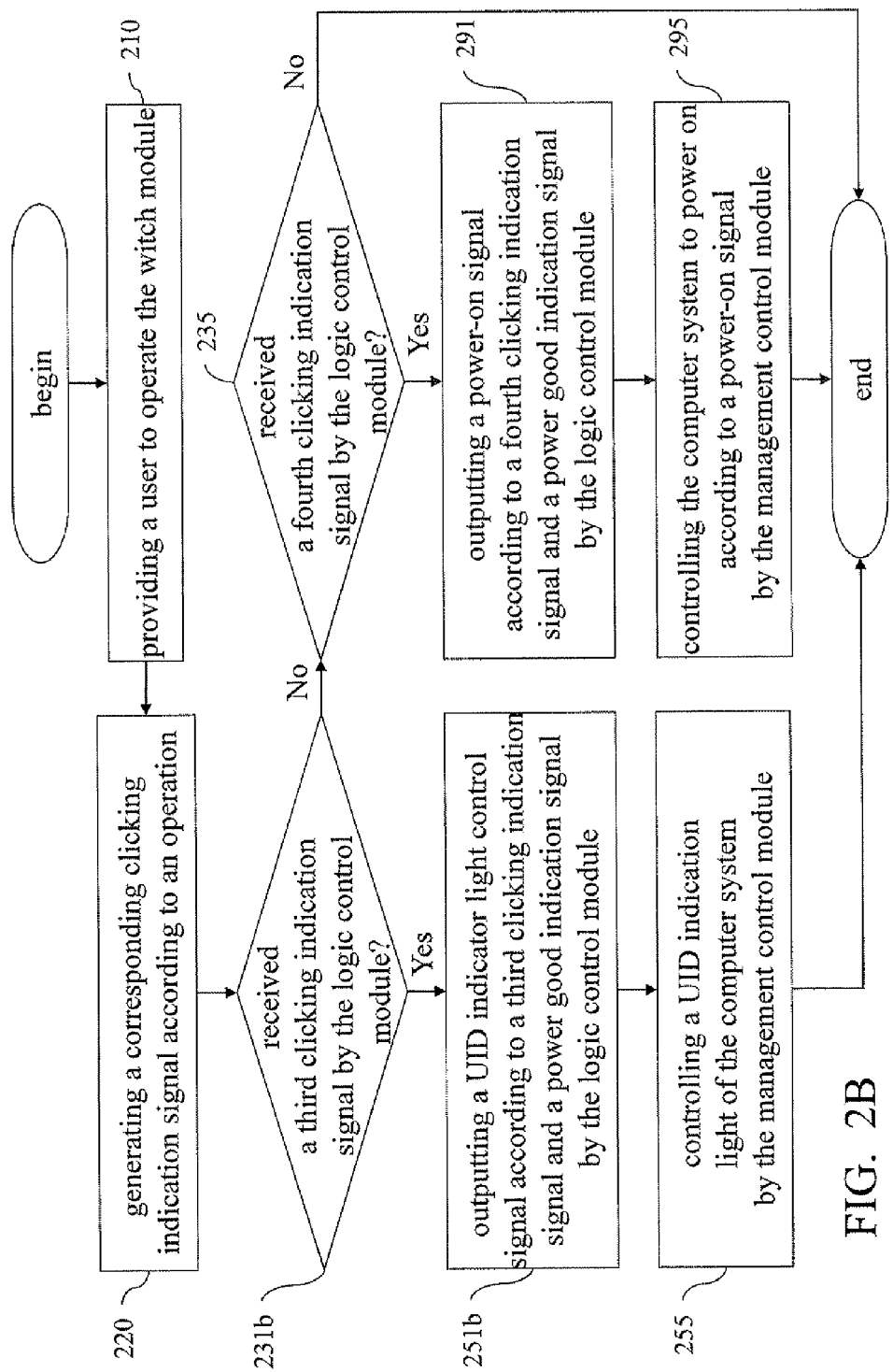
FIG. 2B is a flowchart of another method for the computer system according to the present invention.

Thereafter, a first embodiment is set forth to explain how the system and method of the present invention operates. And, referring to FIG. 2A, in which a flowchart of a key signal processing method used on the computer system according to the present invention is illustrated therein.

In this invention, assume the computer system is a server, on which a power switch, UDI indication light switch and a UID light. The management control module 170 is a baseboard management controller, without limiting the present invention.

When the user has to turns on the UID light of the server, the switch module 130 may provide the user to operate for this purpose (S210). In this embodiment, the user may shortly click the UID light as a first operation.

Afterwards, the UID light comprises in the switch module 130 may generate a corresponding clicking indication signal according to the first operation made by the user (S220). In this embodiment, the corresponding key indication light is a first clicking indication signal.

After the logic control module 150 receives the first clicking indication signal generated by the UID light switch (S231*a*), it may output a UID light control signal according to the first clicking indication signal and the power good signal (S251*a*). In this manner, when the management control module 170 receives the UID light control signal outputted by the logic control module 150, the UID light of the server may be controlled (S255). In this embodiment, the UID light is turned on.

After the server continuously work a long time, the switch module 130 may continue to provide the user to long click (a second operation) the UID light comprised in the switch module 130 if the user desires to reset the baseboard management controller (management control module 170) to avoid the baseboard management controller from giving no response and thus adversely affect the stability of the server (S210). Afterwards, the UID light switch comprised in the switch module 130 may generate a corresponding second key indication light signal according to the second operation made by the user (S220).

After the logic control module 150 receives the second clicking indication signal generated by the UID light in the switch module 130 (S233), the logic control module 150 may output a reset signal according to the second clicking indication signal and the power good signal (S271). As such, the management control module 170 reset itself after receiving the reset signal outputted from the logic control module 150 (S275).

Subsequently, a second embodiment is set forth to explain the system and method of the present invention, and FIG. 28 is illustrated for reference, in which a flowchart of another key signal processing method for the computer system according to the present invention. In this embodiment, assume the computer system is a server, on the server are a power switch and a UID light and the server is under a to-be-booted state, without limiting the present invention.

When the user desires to turns on the UID light of the server, the switch module 130 may provide the user to make a first operation (S210). In this embodiment, assume the user makes a third operation on the power switch comprised in the switch module 130 is double clicking the power switch continuously (S220). In this embodiment, assume the third clicking indication signal comprises a time of changing from high to low, a time of changing from low to high, a time from high to low, and a time form low to high in order. And, the third clicking indication signal maintains at low for a time period after two times of changing from high to low.

After the logic control module 150 receives the third clicking indication signal generated by the power switch in the switch module 130 (S213*b*), the logic control module 150 may output UID light control signal according to the third clicking indication signal and the power good signal (S251*b*). As such, when the management control module 170 receives the UID light control signal outputted by the logic control module 150, it may control the UID light (S255).

Further, when the user desires to boot the server, the switch module 130 may similarly provide the user to make a fourth operation of shortly clicking the power switch comprised in the switch module 130 (S210). Afterwards, the power switch may generate a corresponding fourth clicking indication signal according to the fourth operation made by the user (S220). In this embodiment, the fourth clicking indication signal generated by the power switch experiences two times of level change, and the level after each time of level change maintains a time period.

After the logic control module 150 receives the fourth clicking indication signal generated by the power switch in the switch module 130, the logic control module 150 may output a booting signal according to the forth clicking indication signal and the power good signal (S291). As such, when the management control module 170 receives the booting signal outputted from the logic control module 150, it may control the server to be booted (S295).

It may be known from the two embodiments that the present invention may enable the computer system to be particularly controlled by using the currently available switches under the current state without changing the computer system 100

In view of the above description, it may be appreciated that the computer system and clicking signal processing method therefor have the difference as compared to the prior art that when the user conducts different operations on the switch module, the switch module generates different clicking indication signal, and the logic control module generates a corresponding signal according to the clicking indication signals so that the management control module processes the signal generated by the logic control module, whereby solving the issue existing in the prior art, where multiple switches are difficult to be arranged on the server panel and achieving in the efficacy of saving a design cost of the server panel.

Furthermore, the computer system and clicking signal processing method therefore according to the present invention may be implemented in a hardware, a software or a combination thereof. Alternatively, the method may also be implemented in a single unit or separate computer systems connected with one another with discrete components arranged therein.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A computer system, comprising:
   a switch module, generating a first clicking indication signal and a second clicking indication signal;
   a power control module, generating a standby power good signal;
   a logic control module, connected to the switch module and the power control module, outputting a UID light control signal according to the first clicking indication signal and the power good signal when receiving the first clicking indication signal and the power good signal, and outputting a reset signal according to the second clicking indication signal and the power good signal when receiving the second clicking indication signal and the power good signal; and
   a management control module, connected to the logic control module, controlling a UID light of the computer system according to the UID light control signal when receiving the UID light control signal, and resetting the management control module when receiving the reset signal.

2. The computer system as claimed in claim 1, wherein the switch module comprises a switch, and generates the first clicking indication signal according to a first operation on the switch by a user and the second clicking indication signal according to a second operation on the switch by the user.

3. The computer system as claimed in claim 2, wherein the first operation is shortly clicking the switch, while the second operation is long clicking the switch.

4. The computer system as claimed in claim 1, wherein the logic control module is maintained at an effective potential within a first predetermined period of the first clicking indication signal, and outputting the UID light control signal when the power good signal continuously keeps the effective potential within the first predetermined period, and the logic control module outputs the reset signal when the second clicking indication signal keeps the effective potential within a second predetermined period and the power good signal continuously keeps the effective potential with the second predetermined period.

5. The computer system as claimed in claim 1, wherein the management control module resets the management control module at a standby state and a power-on state and receive the UID light control signal at the standby state and power-on state.

6. The computer system as claimed in claim 1, wherein the management control module is a baseboard management controller (BMC).

7. A computer system, comprising:
   a switch module, generating a third clicking indication signal and a fourth clicking indication signal;
   a power control module, generating a standby power good signal;
   a logic control module, connected to the switch module and the power control module, outputting a UID light control signal according to the third clicking indication signal and the power good signal when receiving the third clicking indication signal and the power good signal, and outputting a power-on signal according to the fourth clicking indication signal and the power good signal when receiving the fourth clicking indication signal and the power good signal; and
   a management control module, connected to the logic control module, controlling the computer system to power on according to the power-on signal when receiving the power-on signal, and controlling a UID light of the computer system according to the UID light control signal when receiving the UID light control signal.

8. The computer system as claimed in claim 7, wherein the switch module comprises a switch, and generates the third clicking indication signal according to a third operation on the switch by a user and the fourth clicking indication signal according to a fourth operation on the switch by the user.

9. The computer system as claimed in claim 8, wherein the third operation is double clicking the switch, while the fourth operation is shortly clicking the switch.

10. The computer system as claimed in claim 7, wherein the logic control module outputs the power-on signal when the fourth clicking indication signal experiences two consecutive level changes and keeps an effective potential within a fixed period, and outputs the UID light control signal when the third clicking indication signal experiences four consecutive level changes and keeps an effective potential within a fixed period for twice among the four consecutive level changes.

11. The computer system as claimed in claim 7, wherein the management control module powers on the computer system at a standby state when receiving the power-on signal, and receives the UID light control signal when the computer system stays at the standby state and a power-on state.

12. The computer system as claimed in claim 7, wherein the management control module is a baseboard management controller (BMC).

13. A clicking signal processing method for a computer system comprising a switch module, a power control module, a logic control module and a management control module, comprising steps of:
   providing a first operation and a second operation for a user on the switch module;
   generating a first clicking indication signal or a second clicking indication signal by the switch module according to the first operation or the second operation respectively;
   outputting a UID light control signal according to the first clicking indication signal and the power good signal by the logic control module when receiving the first clicking indication signal and the power good signal;
   outputting a reset signal according to the second clicking indication signal and the power good signal when receiving the second clicking indication signal and the power good signal; and
   controlling a UID light of the computer system according to the UID light control signal by the management control module when receiving the UID light control signal, and resetting the management control module when receiving the reset signal.

14. The clicking signal processing method as claimed in claim 13, wherein the first operation is shortly clicking a switch included by the switch module, while the second operation is long clicking the switch.

15. The clicking signal processing method as claimed in claim 13, wherein the logic control module is maintained at an effective potential within a first predetermined period of the first clicking indication signal, and outputting the UID control signal when the power good signal continuously keeps the effective potential within the first predetermined period, and the logic control module outputs the reset signal when the second clicking indication signal keeps the effective potential within a second predetermined period and the power good signal continuously keeps the effective potential with the second predetermined period.

16. The computer system as claimed in claim 13, wherein the management control module resets the management control module at a standby state and a power-on state and receives the UID light control signal at the standby state and power-on state.

\* \* \* \* \*